United States Patent
Patil et al.

(10) Patent No.: US 12,519,319 B2
(45) Date of Patent: Jan. 6, 2026

(54) SYSTEM FOR SHARING LOADS ACROSS GENERATOR SETS, GENERATOR SET FOR PROVIDING POWER, AND METHOD OF SYNCHRONIZING GENERATOR SETS

(71) Applicant: Cummins Power Generation Inc., Minneapolis, MN (US)

(72) Inventors: Vaibhav Patil, Maharashtra (IN); Ninad Vaidya, Maharashtra (IN); Ulhas Deutkar, Maharashtra (IN); Pravin Adone, Maharashtra (IN); Prasannakumar Kadam, Maharashtra (IN)

(73) Assignee: Cummins Power Generation Inc., Minneapolis, MN (US)

( * ) Notice: Subject to any disclaimer, the term of this patent is extended or adjusted under 35 U.S.C. 154(b) by 215 days.

(21) Appl. No.: 18/539,179

(22) Filed: Dec. 13, 2023

(65) Prior Publication Data

US 2025/0202243 A1    Jun. 19, 2025

(51) Int. Cl.
*H02J 3/46* (2006.01)
*H02J 3/14* (2006.01)

(52) U.S. Cl.
CPC . *H02J 3/46* (2013.01); *H02J 3/14* (2013.01)

(58) Field of Classification Search
CPC .................. H02J 3/46; H02J 3/14; H02J 3/381
See application file for complete search history.

(56) References Cited

U.S. PATENT DOCUMENTS

| | | | |
|---|---|---|---|
| 5,064,328 A | 11/1991 | Raker | |
| 7,292,422 B2 | 11/2007 | Culligan et al. | |
| 7,340,311 B2 | 3/2008 | Landis et al. | |
| 7,543,170 B2 | 6/2009 | Ross et al. | |
| 8,902,063 B2 | 12/2014 | Auger et al. | |
| 9,847,634 B2 | 12/2017 | Smith et al. | |
| 10,727,014 B2 | 7/2020 | Zinser | |
| 2014/0062199 A1* | 3/2014 | Martinez | H02J 3/00 307/53 |
| 2017/0012439 A1* | 1/2017 | Zhang | H02J 3/48 |
| 2021/0332611 A1 | 10/2021 | Yamashita et al. | |

FOREIGN PATENT DOCUMENTS

| | | | |
|---|---|---|---|
| CN | 107357180 A | 11/2017 | |
| CN | 105680468 B | 9/2018 | |
| CN | 207883551 U | 9/2018 | |
| WO | WO-2015/127093 | 8/2015 | |
| WO | WO-2019032295 A2 * | 2/2019 | H02P 9/10 |

* cited by examiner

*Primary Examiner* — Rexford N Barnie
*Assistant Examiner* — Thai H Tran
(74) *Attorney, Agent, or Firm* — Foley & Lardner LLP (57) ABSTRACT

Presented herein are techniques for sharing loads across generator sets. A system may include a plurality of generator sets electrically coupled with one another to deliver electrical power to a load. A first generator set may include a first control panel to manage delivery of the electrical power between the first generator set and the load. The first generator set may include a first barrier to cover the first control panel to obstruct access to the first control panel from outside. The first generator set may include a first sensor configured to monitor for a state of the first barrier as one of: a closed state or an open state. The first generator set may include a first interlock to send, responsive to detection of the first barrier in the open state, an electrical signal to each generator set to terminate delivery of the electrical power.

20 Claims, 4 Drawing Sheets

SYSTEM FOR SHARING LOADS ACROSS GENERATOR SETS, GENERATOR SET FOR PROVIDING POWER, AND METHOD OF SYNCHRONIZING GENERATOR SETS

BACKGROUND

A generator set may include an engine and a generator to provide power to one or more electric components electrically coupled thereto.

SUMMARY

Aspects of the present disclosure are directed to a system for sharing loads across generator sets. The system can include a plurality of generator sets electrically coupled with one another via a bus to deliver electrical power to a load. A first generator set of the plurality of generator sets can include a first control panel comprising at least one element configured to manage delivery of at least a portion of the electrical power between the first generator set and the load. The first generator set can include a first barrier structured to cover the first control panel to obstruct access to the at least one element on the first control panel from outside the first generator set. The first generator set can include a first sensor configured to monitor for a state of the first barrier as one of (i) a closed state to obstruct the access to the at least one element or (ii) an open state allowing the access to the at least one element. The first generator set can include a first interlock configured to send, responsive to detection of the first barrier in the open state, an electrical signal via the bus to each generator set of the plurality of generator sets to disconnect from the load to terminate delivery of the electrical power.

In some embodiments, a second generator set of the plurality of generator sets can receive, via the bus from the first generator set, the electrical signal to disconnect. The second generator set can cause, responsive to receipt of the electrical signal, an open connection between the second generator set and the load. In some embodiments, the second generator set can include a second control panel configured to present, responsive to the open connection, a fault indication identifying another barrier on another generator set as in the open state.

In some embodiments, the first interlock can receive a second electrical signal via the bus from a second generator set of the plurality of generator sets, in response to detection of a second barrier on the second generator set as being in an open state to allow access to a second control panel of the second generator set. In some embodiments, the first interlock can cause, responsive to receipt of the second electrical signal, an open connection between the first generator set and the load.

In some embodiments, the first interlock can present, responsive to detection of the first barrier in the open state, a first fault indication identifying the first barrier on the first generator set as in the open state. In some embodiments, the first interlock can present, responsive to detection of another barrier in an open state, a second fault indication identifying the other barrier on another generator set of the plurality of generator sets as in the open state.

In some embodiments, the first interlock can restrict, subsequent to the detection of the first barrier in the open state, reconnection of the first generator set with the load until detection of the first barrier reverting to the closed state. In some embodiments, the plurality of generator sets can deliver alternating current (AC) electrical power in synchronization with one another to the load via the bus.

Aspects of the present disclosure are directed to a first generator set for providing power. The first generator set can include a power supply electrically coupled with a load to deliver electrical power. The first generator set can include a control panel configured to manage delivery of the electrical power from the power supply to the load. The first generator set can include a barrier structured to cover the control panel to obstruct access to the control panel from outside the first generator set. The first generator set can include a sensor configured to monitor for a state of the barrier as one of (i) a closed state or (ii) an open state. The first generator set can include an interlock structured to be coupled with the power supply and the sensor. The interlock can cause, responsive to detection of the barrier in the open state, a first connection between the power supply and the load to be opened cease delivery of the electrical power. The interlock can send, responsive to opening of the first connection, an electrical signal to a second generator set to cause a second connection between the second generator set and the load to be opened.

In some embodiments, the interlock can receive a second electrical signal sent by the second generator set in response to detecting a second barrier on the second generator set in the open state. In some embodiments, the interlock can cause, responsive to receipt of the second electrical signal, the first connection between the power supply and the load to be opened.

In some embodiments, the interlock can determine that the power supply is connected with a bus structured to couple a plurality of generator sets with the load while the barrier is in the open state. In some embodiments, the interlock can refrain, responsive to determination that the power supply is connected while the barrier is in the open state, activation of the power supply of the first generator set in response to a start command.

In some embodiments, the interlock can determine that the power supply is disconnected from a bus structured to couple a plurality of generator sets with the load. In some embodiments, the interlock can activate, responsive to determination that the power supply is disconnected and receipt of a start command, the power supply of the first generator set.

In some embodiments, the power supply can use a direct current (DC) voltage different from a second power supply of the second generator set. In some embodiments, the first generator set and the second generator set can output alternating current (AC) power to the load in synchronization. In some embodiments, the power supply can include at least one of (i) a generator, (ii) a battery pack, (iii) a solar panel, (iv) a fuel cell, or (v) a mixed fuel source.

In some embodiments, the control panel can display, responsive to detection of the barrier in the open state, a first fault indication identifying the barrier on the first generator set as in the open state. In some embodiments, the control panel can display, responsive to detection of another barrier in an open state, a second fault indication identifying the barrier on another generator set of a plurality of generator sets as in the open state.

Aspects of the present disclosure are directed to a method of synchronizing generator sets. The method can include providing electrical power from a power supply of a first generator set of a plurality of power generator sets to a load. The method can include monitoring for a state of a first barrier of the first generator set as one of (i) a closed state to obstruct the access to a first control panel on the first generator set or (ii) an open state allowing the access to the first control panel. The method can include causing, responsive to detection of the first barrier in the open state, a first connection between the power supply of the first generator set and the load to be opened to cease delivery of the electrical power. The method can include sending, responsive to opening the first connection, an electrical signal to a second generator set of a plurality of generator sets to cause a second connection between the second generator set and the load to be opened.

In some embodiments, the method can include receiving a second electrical signal from the second generator set, in response to detection of a second barrier on the second generator set as in an open state to allow access to a second control panel of the second generator set. In some embodiments, the method can include causing, responsive to receipt of the second electrical signal, the first connection between the power supply of first generator set and the load to be opened.

In some embodiments, the method can include initiating, responsive to determination that the power supply is disconnected from a bus to couple the plurality of generator sets with the load, activation of the power supply of the first generator set in response to a start command. In some embodiments, the method can include preventing, responsive to the power supply being connected a bus to couple the plurality of generator sets with the load while the first barrier is in the open state, activation of the power supply of the first generator set in response to a start command.

In some embodiments, the method can include restricting reconnection of the first generator set with the load until detection of the first barrier as reverting to the closed state. In some embodiments, the method can include delivering, via the plurality of generator sets in synchronization with one another, alternating current (AC) electrical power to the load, prior to detection of the first barrier in the open state.

BRIEF SUMMARY OF DRAWINGS

The disclosure will become more fully understood from the following detailed description, taken in conjunction with the accompanying figures, wherein like reference numerals refer to like elements unless otherwise indicated, in which.

DETAILED DESCRIPTION

Following below are more detailed descriptions of various concepts related to, and implementations of, systems, methods, apparatuses, and devices for sharing loads across generator sets with interlocks for control panel barriers. The various concepts introduced above and discussed in greater detail below may be implemented in any of a number of ways, as the described concepts are not limited to any particular manner of implementation. Examples of specific implementations and applications are provided primarily for illustrative purposes.

Presented herein is a system for sharing loads across generator sets, generator set for providing power, and method of synchronizing generator sets. The control panel door interlock systems can enhance safety by shutting off the generator operation in the event of unauthorized access. Intentional or unintentional exposure to the control panel's live components can be avoided during operating the generator in synchronization or in solo mode. The generator set can also be protected from any damage can cause due to bystander's engagement with the product. In addition, the system can also restrict the generator set to start in the event of battery disconnection or in the event of opening the generator set's control panel door to conduct any maintenance work for any of the generator set connected in synchronization. This logic ensures fail safe operation. Unless the under-maintenance generator set completely isolates from the synchronization bus, the generator may not start. Further, this interlock system can also ensure cranking the generator only after all the output power cables connected firmly to the power safe box.

The interlock safety system may be used to protect the bystander or user from any electrical hazard, as well as the product, during synchronization or standalone operation. The logic may ensure to avoid interaction of a bystander or user with the generator set's electrical live components. When the generator sets are in synchronization, the logic may ensure shutting down of all the generator sets that are connected in a synchronization loop. In solo mode, the logic may ensure shutting down the generator set upon control panel door is unlocked and opened. Also, the interlock may refrain from starting the generator sets within the synchronization loop when any generator set's control panel door is unlocked and opened.

In addition, unless the under-maintenance generator set (if any) whose battery power gets disconnected is not isolated from the system completely, the interlock logic may not allow to start any generator set which are connected in synchronization loop. The logic may be independent, with respect to generator controller, which helps to deploy the logic to future generator set development without any hassle. The logic may allow to synchronize multiple generator sets, even having different system voltages (e.g., 12 or 24 VDC battery voltage). The number of generators to be connected in synchronization are dependent on controller's capability only, there may be no restriction from the logic. The logic can include fail-safe operation with respect to incorrect integration or component failure.

When multiple generators are connected in synchronization (depending upon the controller's synchronization capability), if any generator set's control panel door is opened, then all the generators connected in synchronization may be shut down with an alarm "Genset Door Open in Synch", and the generator set whose door is opened may have the alarm popped up as "Genset Door Open" along with an alarm "Genset Door Open in Synch". This may aid operators to identify the exact generator set from which the alarm is triggered.

Figure 1:
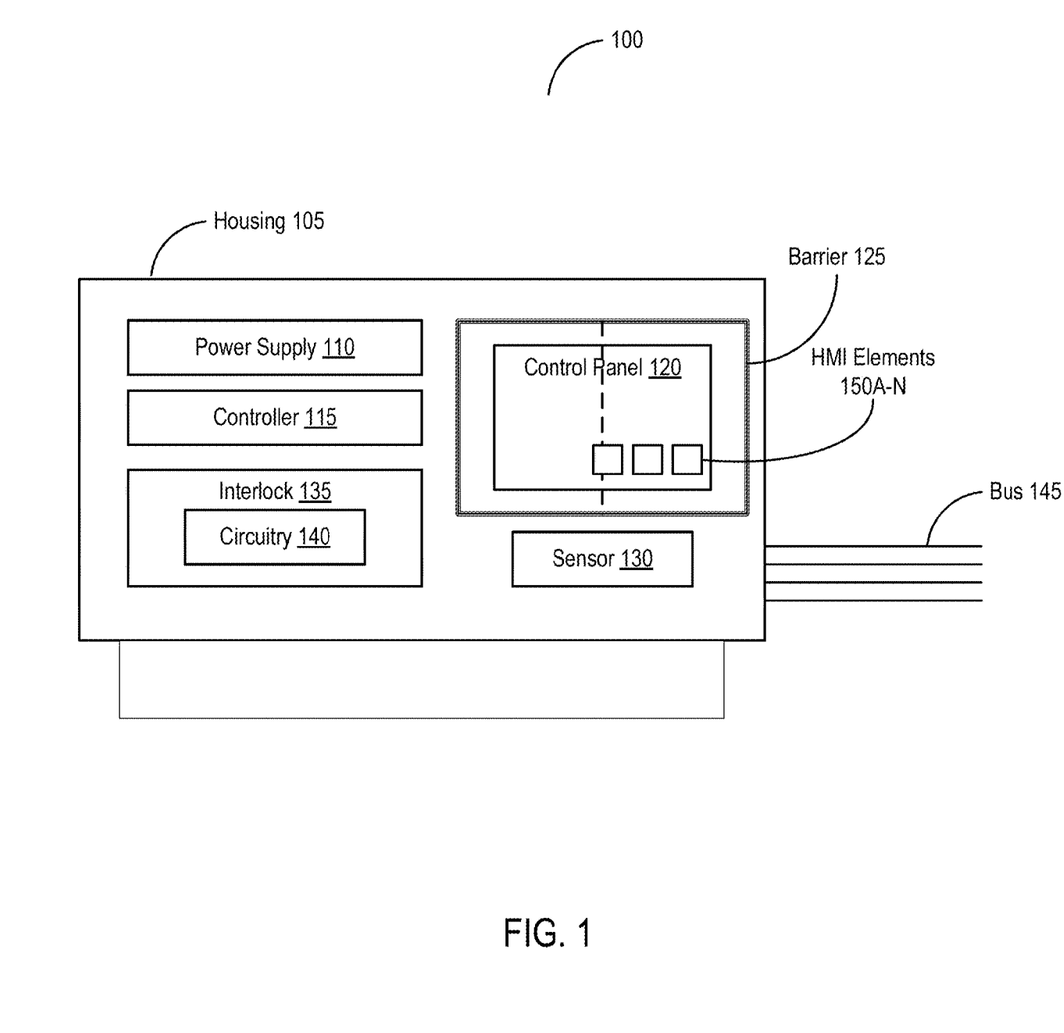
FIG. 1 depicts a block diagram of a generator set for providing electrical power in accordance with an illustrative embodiment.

Referring now to FIG. 1, depicted is a block diagram of a generator set 100 for providing electrical power. In brief overview, the generator set 100 can include at least one housing 105, at least one power supply 110, at least one controller 115, at least one control panel 120, at least one barrier 125, at least one sensor 130, and at least one interlock 135, among others. The interlock 135 can include circuitry 140 to execute various functionalities detailed herein. The generator set 100 can be structured to be electrically coupled with at least one load via at least one bus 145 to convey, provide, or otherwise deliver electrical power to the load via the bus 145. The control panel 120 can include the one or more human-machine interface (HMI) elements 150A-N (hereinafter generally referred to as HMI elements 150). In some embodiments, the generator set 100 can lack some of the components described herein. For example, the generator set 100 can lack the controller 115, and the functionalities ascribed to the controller 115 herein can be performed by the control panel 120.

Components of the generator set 100, such as the controller 120 and the interlock 135, can be implemented using circuitry. The circuitry can include logic or machine-readable instructions to define the behavior, functions, and operations of the controller 115 or the interlock 135. The circuitry can be implemented by computer readable media which can include code written in any programming language, including, but not limited to, Java, JavaScript, Python or the like and any conventional procedural programming languages, such as the "C" programming language or similar programming languages. The machine-readable instructions can be stored and maintained on memory. The circuitry can include one or more processors to execute the machine-readable instructions. The one or more processors can be coupled with the memory to execute the machine-readable instructions therefrom.

The processors in the generator set 100 can communicate with one or more remote processors. The remote processors can be connected to each other through any type of network (e.g., a CAN bus, etc.). The memory (e.g., RAM, ROM, Flash Memory, hard disk storage, etc.) can be a computer-readable medium to store data or computer code for facilitating the various processes described herein. The memory can be communicably connected to the processing circuitry to provide computer code or instructions for executing at least some of the processes described herein. The memory can be or include tangible, non-transient volatile memory or non-volatile memory and can include database components, object code components, script components, or any other type of information structure for supporting the various activities and information structures described herein.

The housing 105 can be a structure to hold, contain, or otherwise include various components of the generator set 100. The structure can be comprised of various materials, such as a metallic material (e.g., steel or aluminum) or a composite material (e.g., wood, concrete, ceramic, or fiberglass), or any combination thereof, among others. The housing 105 can define or include an interior portion and an exterior portion. The interior portion can correspond to a volume defined within the structure of the housing 105. The exterior portion can correspond to an area or region along an outside of the structure of the housing 105. The power supply 110, the controller 115, at least a portion of the control panel 120, or the interlock 135, among others, can be situated, arranged, or otherwise disposed in the interior portion of the housing 105. The housing 105 can physically obstruct or shield the components within the interior portion. At least a portion of the control panel 120, the barrier 125, or the sensor 130, among others, can be situated, arranged, or otherwise disposed along the exterior portion of the housing 105.

The power supply 110 can generate, output, or otherwise provide electrical power via the bus 145. The power supply 110 can be electrically coupled with the load to deliver the electrical power via the bus 145. The power supply 110 can include or correspond to any source of the electrical power for the system 100. The power supply 110 can include, for example, a battery pack (e.g., a collection of batteries to store electrical charge), an engine (e.g., a diesel or combustion engine to produce electrical power), a microgrid (e.g., a localized system of one or more power sources or loads to operate independently or in conjunction with a power grid), a fuel cell (e.g., an electrochemical device to convert fuel such as hydrogen into electrical energy), a renewable fuel power source (e.g., a photovoltaic array or solar panel, a generator coupled with hydraulic turbine, or a wind power generator), a modular reactor (e.g., a nuclear reactor to convert nuclear fuel into energy), a mixed fuel power source (e.g., a source relying on multiple types of fuel such as natural gas, gasoline, and diesel), a power station (e.g., a facility to generate electrical power), or a power interface coupled with an external power component, among others.

The electrical power provided by the power supply 110 to the load can be alternating current (AC) power. In some embodiments, the electrical power provided by the power supply 110 to the generator set 100 can be AC power at an initial voltage or frequency. The generator set 100 can include one or more components to perform AC to AC conversion to output electrical power at a target voltage or frequency. In some embodiments, the electrical power provided by the power supply 110 to the generator set 100 can be direct current (DC) power. The generator set 100 can include one or more components (e.g., rectifiers and inverters) to perform DC to AC conversion to deliver AC power to the load via the bus 145. As the electrical power is converted from DC to AC, the generator set 100 can deliver the AC power to the load via the bus 145. In some embodiments, the power supply 110 can be within the housing 105 of the generator set 100 (e.g., as shown). In some embodiments, the power supply 110 can be outside of the housing 105 or separate from the remainder of the generator set 100 to supply electrical power through the components of the generator set 100.

The power supply 110 can deliver, supply, or otherwise output the electrical power through the generator set 100 onto the bus 145. The bus 145 can be part of an electrical distribution system to deliver the electrical power from the power supply 110 to other components electrically coupled thereto. The bus 145 can include a conductive path (e.g., a wire, a metallic bar, or other connections) to accept the electrical power from the power supply 110 to convey to other components electrically coupled thereto. The bus 145 can be structured to electrically couple the generator set 100 with the load. The bus 145 can be structured to electrically couple an instance of the generator set 100 (e.g., the one shown) with one or more other instances of the generator set 100. An instance of the generator set 100 can be structured to be electrically coupled with one or more other instances of the generator set 100 via the bus 145 to deliver the electrical power to the load.

The controller 115 can regulate, manage, or otherwise control the electrical power conveyed through the generator set 100. The controller 115 can be structured to be coupled with the power supply 110, one or more power electronics components, and the bus 145. The power electronics components can include, for example, at least one rectifier (e.g., a half-wave rectifier, a full-wave rectifier, or a bridge rectifier), at least one inverter (e.g., a single-phase half-bridge inverter, a single-phase full-bridge inverter, and a three-phase voltage source inverter), at least one signal modulator (e.g., to generate pulse width modulation (PWM) signals), and at least one phase control (e.g., a cycloconverter), among others. The controller 115 can modify, change, or otherwise control various power parameters of the electrical power conveyed through the generator set 100, such as voltage, current, frequency, power factor, waveform, modulation, and harmonics, among others.

The control panel 120 can include the one or more human-machine interface (HMI) elements 150. The one or more HMI elements 150 can configure, set, or otherwise manage delivery of at least a portion of the electrical power between the generator set 100 and the load. The HMI element 150 may be used by a user (e.g., an operator) of the generator set 100 to control the delivery of electrical power and operations of the generator set 100. The one or more HMI elements 150 can include hardware interface elements, such as a touchscreen, display, buttons, switches, knobs, sliders, keyboard, or mouse, among others. The one or more HMI elements 150 can include elements of a graphical user interface (GUI) rendered or presented via the display of the control panel 120. At least one of the HMI elements 150 can configure, set, or otherwise control a circuit breaker box in the control panel 120. The control panel 120 can be arranged, positioned, or otherwise situated along the exterior portion of the housing 105 of the generator set 100. The HMI elements 150 of the control panel 120 can be arranged, positioned, or otherwise situated along the exterior portion of the housing 105. The HMI elements 150 can be positioned, situated, or otherwise arranged along a portion of the control panel 120 facing outward from the housing 105 of the generator set 100. The control panel 120 can be structured to be electrically coupled with the controller 115 to communicate command signals and measurement data, among others.

The control panel 120 can be used to set, manage, or otherwise configure various operations of the generator set 100. The operations that can be configured through the control panel 120 can include, for example, a start operation to initialize the generator set 100, a stop operation to shut down the generator set 100, an adjustment to voltage or frequency of the output electrical power, a fuel control to adjust fuel intake or consumption, a temperature control to adjust a cooling system in the generator set 100, circuit breaker to open or close a connection between the generator set 100 and the load, among others. Through the HMI elements 150, the control panel 120 can accept, obtain, or otherwise receive input from the user of the generator set 100. Based on the specifications of the input, the control panel 120 can configure the operations of the generator set 100. For instance, if the user indicates to adjust voltage output via the HMI elements 150, the control panel 120 can relay a command signal to the controller 115 to change the output voltage. The control panel 120 can display or indicate various aspects of the operations of the generator set 100 through the HMI elements 150. For instance, the control panel 120 can render an activation status (e.g., on or off) of the generator set 100 through the touchscreen display.

The barrier 125 can be a physical element structured to protect, conceal, or otherwise cover the control panel 120 to block, prevent, or otherwise obstruct physical access to the HMI elements 150 on the control panel 120 from outside the generator set 100. The barrier 125 can be structured to be coupled along the exterior portion of the housing 105 of the generator set 100. The barrier 125 can be structured to be coupled with at least a portion of the control panel 120, such the portion of the control panel 120 in which the HMI elements 150 are arranged. The physical access can correspond to, for example, the user entering inputs on the HMI elements 150 of the control panel 120 (e.g., including access to the HMI elements 150 for the circuit breaker) or contact with any portion of the control panel 120 from outside the generator set 100. Being electrically coupled with other power components through the controller 115, at least a portion of the control panel 120 can be electrically charged to conduct electricity when contacted. The barrier 125 can be structured to prevent the user from contacting the live portion of the control panel 120.

The barrier 125 can be mechanically coupled to the exterior portion of the housing 105 or the portion of the control panel 120 via at least one bearing element. The bearing element can limit or constrain motion of the barrier 125 relative to a portion at which the barrier 125 is mechanically coupled with the exterior portion of the housing 105 or the control panel 120. The bearing element can include, for example, a hinge or a sliding track, among others. The barrier 125 can be mechanically coupled to the exterior portion of the housing 105 or the portion of the control panel 120 via a securing element. The securing element can fix, secure, or otherwise attach the barrier 125 to the exterior portion of the housing 105 or the control panel 120 to obstruct physical access. The securing element can include, for example, a latch, a lock, a fastener, a snap, a tie, a clip, or hook and loop, among others. In some embodiments, the barrier 125 can lack the bearing element, and can be secured against the exterior portion of the housing 105 or the portion of the control panel 120 by connecting with the securing element.

The barrier 125 can be in a closed state or an open state. The closed state may obstruct access to the control panel 120. When in the closed state, the barrier 125 can be mechanically attached, connected, or otherwise secured against the exterior portion of the housing 105 or the portion of the control panel 120 (e.g., where the HMI elements 150 are arranged) via the securing element. The barrier 125 can block, prevent, or otherwise obstruct physical access to the HMI elements 150 on the control panel 120 from outside the generator set 100. For example, the barrier 125 can obstruct physical access to the HMI elements 150 to control the circuit breaker via the control panel 120. Conversely, the open state may allow access to the control panel 120. When in the open state, the barrier 125 can be detached, unconnected or otherwise not secured against the exterior portion of the housing 105 or the portion of the control panel 120. The barrier 125 can be mechanically coupled to the exterior portion of the housing 105 or the portion of the control panel 120 via the bearing element and may be rotated or moved relative to the exterior portion of the housing 105 or the portion of the control panel 120. For example, if connected via a hinge, the barrier 125 may have been swung open about the hinge to be in the open state. With the barrier 125 being in the open state, the user can gain physical access to the control panel 120 on the exterior portion of the housing 105 and can be free to enter inputs on the HMI elements 150 or contact an exterior portion of the control panel 120.

The sensor 130 can instrument, identify, or otherwise monitor a state of the barrier 125 as in the open state or the closed state. The sensor 130 can be structured to be coupled with the barrier 125. In some embodiments, the sensor 130 can be structured to be coupled with the controller 115, the control panel 120, or the interlock 135, among others. The sensor 130 can monitor the state of the barrier 125 using any number of methods. In some embodiments, the sensor 130 can be a photodetector to monitor the state of the barrier 125. The sensor 130 can radiate, output, or otherwise emit a light beam across the movement path of the barrier 125 between when the barrier 125 is in the closed state or in the open state. When the light beam is detected as interrupted (e.g., due to the obstruction by the barrier 125 being secured against the exterior portion of the housing 105), the sensor 130 can identify the barrier 125 as in the closed state. Conversely, when the light beam is detected as not interrupted, the sensor 130 can identify the barrier 125 as in the open state. The sensor 130 can relay, transmit, or otherwise send an indication of the state of the barrier 125 to the interlock 135.

In some embodiments, the sensor 130 can monitor an electrical current through the barrier 125 to identify the state of the barrier 125. The barrier 125 can include a conductive path electrically coupled with the control panel 120 (or another portion of the generator set 100) and the sensor 130. Forming a closed circuit when in the closed state, the conductive path of the barrier 125 can convey or pass the electrical current between the control panel 120 and the sensor 130. When the electrical current is detected as being passed through, the sensor 130 can identify the barrier 125 as in the closed state. In contrast, when the electrical current is detected as not being passed through due to the open circuit, the sensor 130 can identify the barrier 125 as in the open state. The sensor 130 can relay, transmit, or otherwise send the indication of the state of the barrier 125 to the interlock 135.

In some embodiments, the sensor 130 can use an electromechanical switch (e.g., a magnetic reed switch) to monitor the state of the barrier 125. A switch can be arranged, situated, or otherwise positioned on the exterior portion of the housing 105 or the control panel 120 (e.g., at a portion to be attached to the securing element). A magnet can be arranged, situated, or otherwise positioned on the barrier 125 (e.g., along the securing element). When no magnetic field is detected through the switch, the sensor 130 can identify the state of the barrier 125 as in the open state. When a magnetic field is detected from the magnet being in contact or in proximity with the switch, the sensor 130 can identify the state of the barrier 125 as in the closed state. The sensor 130 can relay, transmit, or otherwise send the indication of the state of the barrier 125 to the interlock 135.

In some embodiments, the sensor 130 can be a proximity sensor (e.g., a capacitive sensor) to monitor the state of the barrier 125. The sensor 130 can be positioned, arranged, or otherwise situated along the exterior portion of the housing 105 or the control panel 120. The sensor 130 can have a capacitor to measure capacitance and can be positioned to sense the presence of the barrier 125 when in the closed state (e.g., secured to the exterior portion of the housing 105 or the control panel 120) by measuring the capacitance. When the barrier 125 is proximate (e.g., within a distance of 1-2.5 cm) to the sensor 130, the sensor 130 can detect a change in capacitance and can identify the barrier 125 as in the closed state. Otherwise, when the barrier 125 is not proximate (e.g., outside the distance of 1-2.5 cm) to the sensor 130, the sensor 130 can detect no change in the capacitance and can identify the barrier 125 as in the open state. The sensor 130 can relay, transmit, or otherwise send the indication of the state of the barrier 125 to the interlock 135.

The interlock 135 can configure, set, or otherwise control the operations of the generator set 100 and coordinate the operations of the generator set 100 with other instances of the generator set 100 based on the monitoring of the state of the barrier 125. The interlock 135 can be structured to be coupled with the power supply 110 and the sensor 130. In some embodiments, the interlock 135 can be structured to be coupled with the controller 115 and the control panel 120.

The circuitry 140 of the interlock 135 can be used to execute the functionalities of the interlock 135 detailed herein.

In some embodiments, the circuitry 140 can include one or more analog electronic components coupled with one another to carry out the functionalities of the interlock 135. The analog electronic components can include resistors, capacitors, inductors, switches, and active components (e.g., amplifiers or transistors), among others. In some embodiments, the circuitry 140 can include one or more digital electronic components (along with analog electronic components) coupled with one another to carry out the functionalities of the interlock 135. The digital components can include logic gates implemented using transistors and switches, such as a buffer, an inverter, a conjunction component, or disjunction component, among others. In some embodiments, the circuitry 140 of the interlock 135 can include one or more processors coupled with memory to execute the functionalities detailed herein. The memory can store and maintain computer-readable instructions defining the functionalities of the interlock 135. The processors can execute the instructions on the memory.

In some embodiments, the circuitry 140 can include at least one circuit breaker (sometimes referred herein as a circuit breaker box or a power box). The circuit breaker can be electrically coupled with the power supply 110 and the load. The circuit breaker of the circuitry 140 can be disposed, situated, or otherwise arranged within the interior portion of the housing 105 of the generator set 100. The circuit breaker can be structured to be coupled with the control panel 120. For instance, the control panel 120 can have one or more HMI elements 150 to configure the connection between the power supply 110 and the load via the circuit breaker. The circuit breaker can disrupt, open, or otherwise interrupt flow of the electrical power through the generator set 100. The circuit breaker can include, for example, a single-pole circuit breaker, a double-pole circuit breaker, a ground fault circuit interrupter circuit breaker (GFCI), an arc fault circuit interrupter circuit breaker (AFCI), an air circuit breaker (ACB), a gas-insulated circuit breaker (e.g., using sulfur hexafluoride (SF6)), an oil circuit breaker, and a vacuum circuit breaker, among others.

The interlock 135 can determine, identify, or monitor the state of the barrier 125 as in one of the open state or the closed state using the sensor 130. The interlock 135 can retrieve, obtain, or otherwise receive the indication of the state of the barrier 125 from the sensor 130. When the indication from the sensor 130 identifies the state as in the closed state, the interlock 135 can detect the barrier 125 as in the closed state. Furthermore, the interlock 135 can continue to monitor the state of the barrier 125 using the sensor 130. Conversely, when the indication from the sensor 130 identifies the state as in the open state, the interlock 135 can detect the barrier 125 as in the open state. The interlock 135 can initiate operations to shut down the generator set 100 and disconnect and isolate the generator set 100 from the bus 145.

In response to the detection of the barrier 125 as in the open state, the interlock 135 can cause a connection between the power supply 110 and the load to be disconnected or opened to terminate or cease the delivery of the electrical power through the generator set 100. In some embodiments, the interlock 135 can use the circuit breaker to disconnect or open the connection between the power supply 110 and the load. Upon detecting the barrier 125 as in the open state, the interlock 135 can convey, send, or otherwise transmit a command to the circuit breaker in the generator set 100 to disconnect or open the connection between the power supply 110 and the bus 145 (or the load). In response to receiving the command, the circuit breaker can disconnect or open the connection between the power supply 110 and the load to halt, terminate, or otherwise cease delivery of power from the power supply 110 through the generator set 100.

The interlock 135 can initiate shutdown, termination, or ceasing of operations of the generator set 100, in response to detecting the barrier 125 as in the open state. The shutting down of the operations of the generator set 100 can include stopping of the generation and outputting of the electrical power from the generator set 100. In some embodiments, the interlock 135 can shut down, disable, or otherwise deactivate the power supply 110 to halt, terminate, or otherwise cease outputting of electrical power from the power supply 110. For example, the interlock 135 can stop the running of the engine of the power supply 110 of the generator set 100, thereby halting production of electrical power. Once fully shut down, any previously live portions on the generator set 100 (e.g., live portion of the control panel 120) can cease being electrically charged, thereby allowing the user to contact the components without electrical interactions. In some embodiments, the interlock 135 can cease operations of the generator set 100 in response to detecting the barrier 125 as in the open state, without disconnecting or opening the connection between the power supply 110 and the bus 145.

After the detection of the barrier 125 as in the open state, the interlock 135 can limit, inhibit, or otherwise restrict rebooting, restarting, or reactivation of the generator set 100 (or the power supply 110) until detecting the barrier 125 as returning or reverting to the closed state. In some embodiments, the interlock 135 can refrain from reactivating the generator set 100, even in response to a start command (e.g., received via the HMI elements 150 of the control panel 120). In some embodiments, the interlock 135 can limit, inhibit, or otherwise restrict reconnection of the generator set 100 (or the power supply 110) with the load on the bus 145, until the detection of the barrier 125 as reverting to the closed state. The interlock 135 can refrain from re-establishing the connection, even in response to the start command. The restriction from reactivation of the generator set 100 and re-establishing the connection with the load may be in furtherance of preventing the user from contacting live portions of the generator set 100.

The interlock 135 can determine whether to continue the restriction of the reactivation of the generator set 100 or the re-establishment of the connection based on the state of the barrier 125. The interlock 135 can monitor the state of the barrier 125 using the sensor 130. The interlock 135 can retrieve, obtain, or otherwise receive the indication of the state of the barrier 125 from the sensor 130. When the barrier 125 is detected as in the closed state, the interlock 135 can permit reactivation of the generator set 100. In some embodiments, the interlock 135 can automatically reactivate the generator set 100 in response to detecting that the barrier 125 has returned to the closed state. In some embodiments, the interlock 135 can allow or permit the reactivation of the generator set 100 in response to the start command upon detecting that the barrier 125 as having returned to the closed state. The interlock 135 can also allow or permit re-establishment of the connection between the generator set 100 and the load (or the bus 145). In some embodiments, the interlock 135 can automatically re-establish the connection (e.g., by causing a closed circuit). In some embodiments, the interlock 135 can permit the re-establishment of the connection in response to the start command upon detecting that the barrier 125 as having returned to the closed state.

Conversely, when the barrier 125 is detected as still in the open state, the interlock 135 can continue to restrict the reactivation of the generator set 100 (or the power supply 110) and the re-establishment of the connection between the power supply 110 and the bus 145 (or the load). The interlock 135 can remove the restriction upon determining that the generator set 100 is isolated from other instances of the generator set 100. While the barrier 125 is detected as in the open state, the interlock 135 can identify or determine whether the generator set 100 (or the power supply 110) is connected with the bus 145 (or the load). If the power supply 110 is determined to be connected with the bus 145, the interlock 135 can restrict the reactivation of the generator set 100 (or the power supply 110). In some embodiment, the interlock 135 can refrain from reactivating the generator set 100 in response to a start command (e.g., entered via the HMI elements 150 of the control panel 120). Conversely, if the power supply 110 is determined to be disconnected from the bus 145, the interlock 135 can allow or permit reactivation of the generator set 100 (or the power supply 110). In some embodiments, the interlock 135 can restart, reboot, or otherwise reactivate the generator set 100 (or the power supply 110) in response to receipt of the start command.

Figure 2:
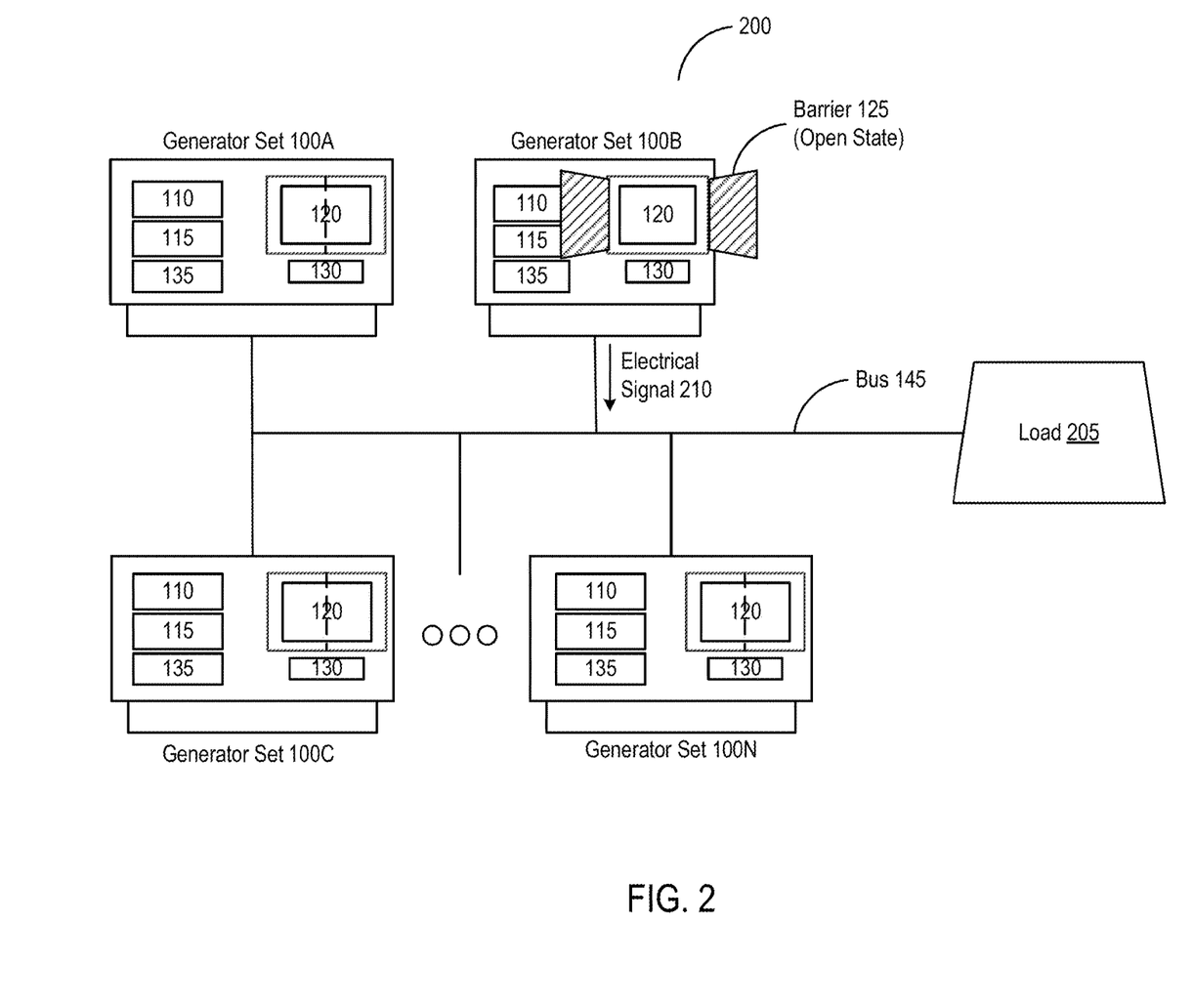
FIG. 2 depicts a block diagram of a system for sharing loads across generator sets in accordance with an illustrative embodiment.

Referring now to FIG. 2, depicted is a block diagram of a system 200 for sharing loads across generator sets. The system 200 can include a set of generator sets 100A-N (hereinafter generally referred to as generator sets 100), among others. The functionalities ascribed to the generator set 100 described in conjunction with FIG. 1 can be performed at each instance of the generator set 100 in the system 200. The one or more generator sets 100 can be electrically coupled with one another and at least one load 205 via the bus 145. In some embodiments, the system 200 can include at least one load 205 structured to be electrically coupled with one or more of the generator sets 100. The generator sets 100 can be electrically coupled with one another in parallel (e.g., as depicted), in series, or any combination thereof. The load 205 can include any number of electrical components to receive, accept, or otherwise consume the electrical power delivered from the generator sets 100. The load 205 can be a part of or can include, for example, residential units (e.g., electrical appliances in homes or apartments), commercial buildings (e.g., lighting, heating, ventilation, air conditioning, and elevators), construction sites (e.g., construction related machinery), data centers (e.g., server farms and other networking equipment), agricultural operations (e.g., farming equipment), event facilities (e.g., lights, loudspeakers, and other equipment), and mining operations (e.g., power equipment, mining conveyors, and trucks), among others.

The generator sets 100 can supply, output, or otherwise deliver AC electrical power in synchronization with one another to the load 205 via the bus 145. At each generator set 100, the controller 115 can carry out, execute, or otherwise perform power synchronization (e.g., AC power synchronization) between the electrical power from the instance of the generator set 100 (e.g., generator set 100A) with the electrical power delivered on the bus 145 from one or more other instances of the generator set 100 (e.g., generator sets 100B-N). In some embodiments, the power supply 110 at one instance of the generator set 100 can initially produce, supply, or otherwise output DC electrical power. The DC voltage of the electrical power can differ from a DC voltage of the electrical power outputted by another instance of the generator set 100. In some embodiments, the power supply 110 of the generator set 100 can use the DC voltage different from the DC voltage of another power supply of another instance of the generator set 100. The generator set 100 can include one or more components (e.g., rectifiers and inverters) to perform DC to AC conversion to deliver AC power to the load via the bus 145. The power synchronization can be continuously performed, while the barrier 125 at each generator set 100 electrically coupled with the bus 145 are determined to be in the closed state.

To perform the synchronization, the controller 115 at each generator set 100 can measure, instrument, or otherwise sense the power parameter (e.g., frequency, phase, voltage, and waveform) of the electrical power from the power supply 110. In addition, the controller 115 can measure, instrument, or otherwise sense the power parameter (e.g., frequency, phase, voltage, and waveform) of the electrical power conveyed on the bus 145. The power parameters of the electrical power on the bus 145 can be used to reference power parameters, to which the generator sets 100 are to match. Using the power parameters, the controller 115 can adjust, change, or otherwise modify the power parameter of the electrical power from the power supply 110 to match the reference power parameter of the electrical power on the bus 145. For example, the controller 115 at the generator set 100A can adjust the frequency, phase, and voltage of the output electrical power to match the frequency, phase, and voltage of the reference respectively on the bus 145.

As electrical power is delivered from the generator sets 100, the interlock 135 at one of the generator sets 100 (e.g., the generator set 100B) can monitor the state of the barrier 125 as in one of the open state or the closed state using the sensor 130 at the generator set 100. The interlock 135 can retrieve, obtain, or otherwise receive the indication of the state of the barrier 125 from the sensor 130. In some embodiments, the interlock 135 at each generator set 100 can broadcast, transmit, or otherwise send the indication of the state of the barrier 125 to the other generator sets 100 coupled with the bus 145. For example, the interlock 135 at the generator set 100A can continuously provide the indication of the barrier 125 of the generator set 100A as in the closed state as identified by the sensor 130 to all the other generator sets 100B-N.

When the indication from the sensor 130 identifies the state as in the closed state, the interlock 135 can detect the barrier 125 as in the closed state. Furthermore, the interlock 135 can continue to monitor the state of the barrier 125 using the sensor 130. Conversely, when the indication from the sensor 130 identifies the state as in the open state, the interlock 135 can detect the barrier 125 as in the open state. The interlock 135 can initiate operations to shut down the generator set 100 and disconnect and isolate the generator set 100 (e.g., the generator set 100B) from the bus 145 as detailed herein. For example, the interlock 135 at the generator set 100B can cause the connection between the power supply 110 and the load 205 to be disconnected or opened and can shut down the generator set 100B or the power supply 110.

The interlock 135 of the generator set 100 at which the barrier 125 is detected as in the open state (e.g., of the generator set 100B as depicted) can transmit, convey, or otherwise send at least one electrical signal 210 to one or more other instances of the generator set 100 (e.g., the generator set 100A) via the bus 145. In some embodiments, the interlock can send the electrical signal 210 to each of the other generator sets 100. The electrical signal 210 can include an indication of the barrier 125 of the generator set 100 as in the open state. In some embodiments, the electrical signal 210 can include an indication that the connection between the power supply 110 of the generator set 100 and the load is disconnected or open. In some embodiments, the electrical signal 210 can include an indication that that the operations of the generator set 100 is shut down in response to detecting the barrier 125 as in the open state. In some embodiments, the electrical signal 210 can include an indication that that the power supply 110 is shut down in response to detecting the barrier 125 as in the open state. In some embodiments, the electrical signal 210 can be a command to the recipient instance of the generator set 100 to disconnect or open a connection between the recipient instance of the generator set 100 with the load 205. In some embodiments, the electrical signal 210 can be a command to the recipient instance of the generator set 100 to cease or terminate delivery of electrical power.

The interlock 135 of the recipient generator set 100 (e.g., the generator set 100A) can retrieve, obtain, or otherwise receive the electrical signal 210 from the generator set 100 at which the barrier 125 is detected as in the open state (e.g., of the generator set 100B). The electrical signal 210 can be received via the bus 145 connected with the generator sets 100. Upon receipt of the electrical signal 210, the interlock 135 can cause a connection between the power supply 110 and the load 205 to be disconnected or opened to cease the delivery of electrical power through the generator set 100. In some embodiments, the interlock 135 can forward, relay, or otherwise pass the command of the electrical signal 210 to the circuit breaker in the generator set 100 to disconnect or open the connection between the power supply 110 and the bus 145 (or the load). In response to receiving the electrical signal 210, the circuit breaker can disconnect or open the connection between the power supply 110 and the load to cease delivery of power through the generator set 100.

The interlock 135 can also initiate ceasing of operations of the generator set 100 in response to receipt of the electrical signal 210. In some embodiments, the interlock 135 can deactivate the power supply 110 to cease outputting of electrical power from the power supply 110 onto the bus 145. In some embodiments, the interlock 135 can cease operations of the generator set 100. In some embodiments, the interlock 135 can cease operations of the generator set 100. Once fully shut down, any previously live portions on the generator set 100 (e.g., live portion of the control panel 120) can cease being electrically charged, thereby allowing the user to contact the components without electrical interactions. The interlock 135 can refrain from re-establishing the connection, even in response to the start command. The restriction from reactivation of the generator set 100 and re-establishment of the connection until the barrier 125 of the affected generator set 100 (e.g., the generator set 100B) is returned to the closed state or is isolated from the remaining set of generator sets 100 coupled with the bus 145.

The control panel 120 can render, display, or otherwise present an indication of an operational state of the generator set 100. The operational state can include, for example, a normal state indicating that the generator sets 100 are delivering electrical power on the bus 145, or a fault state indicating at that at least one of the generator sets 100 have undergone a fault (e.g., due to the barrier 125 being in the open state). The operational state can be presented via the HMI elements 150 of the control panel 120, such as a display or an alarm. The control panel 120 can identify or select the indication to present based on the indication provided by the interlock 135 at the same generator set 100 or the electrical signal 210 sent from another generator set 100. When no fault is detected at any of the generator sets 100 coupled with the bus 145, the control panel 120 at each generator set 100 can display or present an indication of normal operations at the generator set 100.

When the barrier 125 at the same generator set 100 as the control panel 120 (e.g., the generator set 100B) is detected as an open state, the control panel 120 can display or present a fault indication identifying the barrier 125 at the same generator set 100 as in the open state. For example, the interlock 135 at the generator 100B may have detected the barrier 125 as in the open state and can send an indication of the detection to the control panel 120. The control panel 120 in turn can display the fault indication "Genset door open." When the barrier 125 at another generator set 100 as the control panel 120 is detected as an open state, the control panel 120 can display or present a fault indication identifying the barrier 125 at another generator set 100 as in the open state. For example, the interlock 135 at the generator set 100A may have received the electrical signal 210 indicating that the barrier at the generator set 100B is detected to be in the open state. Upon receipt, the interlock 135 can relay the indication to the control panel, and the control panel 120 in turn can display the fault indication "Genset door open in sync."

With the detection of the barrier 125 on at least one of the generator sets 100 as in the open state, the interlock 135 at each generator set 100 can limit, inhibit, or otherwise restrict reactivation of the generator set 100 (or the power supply 110). The reactivation of any of the generator sets 100 may be restricted until detecting the barrier 125 of the affected generator set 100 (e.g., of the generator set 100B) as returning or reverting to the closed state. In some embodiments, the interlock 135 can refrain from reactivating the generator set 100, even in response to a start command (e.g., received via the HMI elements 150 of the control panel 120). In some embodiments, the interlock 135 can limit, inhibit, or otherwise restrict reconnection of the generator set 100 (or the power supply 110) with the load on the bus 145, until the detection of the barrier 125 as reverting to the closed state. The interlock 135 can refrain from re-establishing the connection, in response to the start command.

At each generator set 100, the interlock 135 can determine whether to continue the restriction of the reactivation of the generator set 100 or the re-establishment of the connection based on the state of the barrier 125 of the affected generator set 100 (e.g., the generator set 100B). The interlock 135 of each generator set 100 (including the generator set 100B) can continue to provide the electrical signal 210 to indicate the state of the barrier 125 as in the open state or the closed state.

When the barrier 125 of the affected generator set 100 (e.g., the generator set 100B) is detected as returning to the closed state, the interlock 135 at the recipient generator set 100 can permit reactivation of the generator set 100. For instance, when the barrier 125 at the generator set 100B is indicated as reverting to the closed state, the interlock 135 at generator set 100A can permit the reactivation of the generator set 100A or the power supply 110 therein. The interlock 135 can also allow or permit re-establishment of the connection between the generator set 100 and the load 205 (or the bus 145). Conversely, when the barrier 125 of the affected generator set 100 is detected as still in the open state, the interlock 135 can continue to restrict the reactivation of the generator set 100 or the power supply 110 therein. The interlock 135 can remove the restriction and permit reactivation, upon determining that the affected generator set 100 is isolated from the other generator sets 100 coupled with the bus 145.

Figure 3:
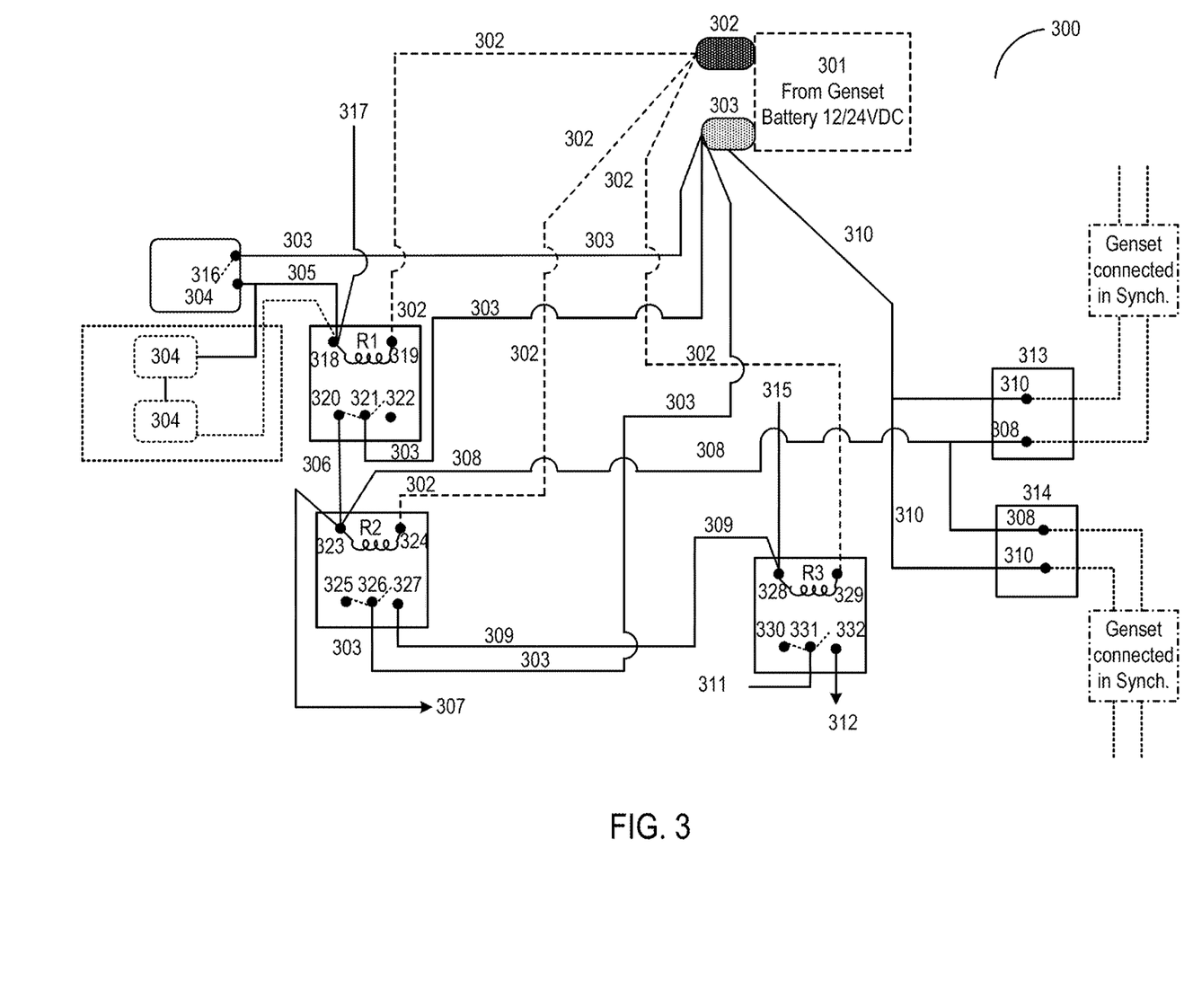
FIG. 3 is a schematic drawing of a generator set control panel door interlock, in accordance with an illustrative embodiment.

Referring now to FIG. 3, depicted is a schematic drawing of a system or circuitry 300 for generator set control panel door interlock. The circuitry 300 can be used to implement the circuitry 140 of the interlock 135. The circuitry 300 can provide enhanced electrical safety for bystander or user as well as product during synchronization or standalone operation of a generator set 100. Also, the interlock 135 in the circuitry 300 may improve up time of the generator by restricting unauthorized access. The function of this logic is defined in two scenarios: (316) generator set control panel door closed and locked and (316) generator set control panel door unlocked and open. Below is a table for referencing the circuitry 300:

| Location | Description |
|---|---|
| 301 | Genset Battery |
| 302 | Battery Positive |
| 303 | Battery Negative |
| 304 | Door positioning switch/Sensor |
| 305 | Door close signal, this signal may be activated when door is close |
| 306 | R6 Normal close output |
| 307 | "Door Open in Synch" signal to Genset controller |
| 308 | "Door Open in Synch" signal to Genset controller which are connected in synchronization |
| 309 | CB open override command to relay |
| 310 | Battery negative common bus across the genset connected in synchronization |
| 311 | Power to operate genset circuit breaker open coil |
| 312 | Electrical signal to genset circuit breaker open coil |
| 313 | Genset interface connection for synchronization loop genset |
| 314 | Genset interface connection for synchronization loop genset |
| 315 | Genset circuit breaker open command from genset controller |
| 316 | Normal open contact of switch or sensor |
| 317 | Genset control panel door open input signal to controller |
| 318 | Relay R1, Negative supply port to coil |
| 319 | Relay R1, Positive supply port to coil |
| 320 | Relay R1, Normal Close port when relay coil inactive |
| 321 | Relay R1, Common port for Normal Close and Normal Open port |
| 322 | Relay R1, Normal Open port when relay coil inactive |
| 323 | Relay R2, Negative supply port to coil |
| 324 | Relay R2, Positive supply port to coil |
| 325 | Relay R2, Normal Close port when relay coil inactive |
| 326 | Relay R2, Common port for Normal Close and Normal Open port |

-continued

| Location | Description |
|---|---|
| 327 | Relay R2, Normal Open port when relay coil inactive |
| 328 | Relay R3, Negative supply port to coil |
| 329 | Relay R3, Positive supply port to coil |
| 330 | Relay R3, Normal Close port when relay coil inactive |
| 331 | Relay R3, Common port for Normal Close and Normal Open port, this Relay port (331) may be AC or DC supply in nature as per MCCB open coil compatibility |
| 332 | Relay R3, Normal Open port when relay coil inactive |
| R1 | Relay, active state when door is closed |
| R2 | Relay, inactive state when door is closed |
| R3 | Relay, for Circuit breaker open, controller by generator controller as well as R2 Relay |

Under the first scenario, generator set control panel door may be closed and locked. In this scenario, an output electrical signal (305) from the sensor or switch (304) may be activated and fed to Relay (R1). The Relay (R1) coil may be energized as the electrical path of the Relay (R1) coil and may be completed based on the positive signal (302) fed from generator set battery. The Relay (R1) may be used to ensure fail safe operation of the logic. Once Relay (R1) coil is energized, further door interlock circuitry may be in an electrically inactive state since the further circuit has been routed through Normally Closed (320) contact of Relay (R1). An electrical signal (317) is an input to the respective generator set controller to sense the generator set door is in closed state. An electrical signal (317) may be always in active state in the event of generator set control panel door in closed state. This may ensure fail safe operation with respect to generator set's controller door alarm acknowledgement. As a result, all the generator sets which are connected in synchronization loop may not generate any alarm, with respect to the door open alarm.

Under the second scenario, generator set control panel door may be unlocked and opened. During the scenario, an output electrical signal (305) from the sensor or switch (304) may be deactivated. Hence the Relay (R1) coil may not be energized, and eventually, an electrical signal (306) from Relay (R1) may be activated and fed to Relay (R2) coil. The Relay (R2) coil may be energized as the electrical path of the Relay (R2) coil and may be completed based on the positive signal (302) fed from generator set's battery. An electrical signal (317) may be an input to the respective generator set's controller to sense the generator set door is in open state. An electrical signal (317) may be in an inactive state in the event of generator set's control panel door in open state. The respective input port from respective controller may be configured as to generate an alarm when electrical signal (317) is in inactive state. Based on the configuration, the respective generator set's controller may generate door open alarm with a message "Genset Door Open" while the generator is in solo or synchronization mode. This may ensure fail safe operation with respect to generator set's controller door alarm acknowledgement. Further, the respective input port from respective controller may be configured as to generate the alarm when electrical signal (307) is in active state. Based on the configuration, the respective generator controller may generate door open alarm with a message "Genset Door Open in synch" while the genset is in solo or synchronization mode.

The Relay (R2) may be used to provide electrical isolation with respect to battery polarity for the generator sets connected in synchronization loop. The Relay (R3) coil may be energized based on the output received from Relay's (R2) Normally Open (327) contact and the input signal (302 or 303) from generator set battery. The output from Relay (R2) can have polarity either Positive or Negative, based on the respective generator controller's nature of offering digital output polarity (either Positive or Negative). The Relay (R3) may be used for offering respective generator set's circuit breaker open command. Upon the generator set control panel door open, the logic may ensure opening the generator's circuit breaker, by overriding the signal (315) from the respective generator controller. This may be used for quick turnaround to enhance the safety of bystander as well as the product.

During synchronization mode, upon respective generator set control panel door in open state, an electrical signal (308) may be activated and fed to all the generator sets which are connected in synchronization loop. An electrical signal (308) may activate the Relay (R2) in all the generator sets connected in synchronization loop. An electrical signal (310) may be used for to create common negative bus across the generator sets connected in synchronization loop, which may ensure Relay (R2) coil's load on respective generator's battery only. Electrical signals (308 and 310) may be used to communicate with the generator control panel door open alarm from any generator set whose door is open to all the generator sets which are connected in synchronization loop. This may enable them to synchronize the generator sets with different DC system voltage (e.g., 12 VDC or 24 VDC). During normal generator operation the Relay (R3) may be controlled by respective generator's controller to open the generator's circuit breaker, through an electrical signal (315).

The door interlock system herein may protect accessing multiple control panel doors (currently 2 doors per generator set). The door opening and closing may be electrically sensed through the respective sensors or switches (304). A potential free contact (316) may have been used in the electrical circuit by a respective sensor or switch (304) to convert the door position (open or closed) into electrical signals (305). This electrical signal (305) from sensor or switch (304) may be generated only when the generator set's control panel doors are in the closed and locked condition. This generated electrical signal (305) may be derived from the respective generator set's battery (301) negative (303) signal. The electrical signal (305) may be disconnected when the generator set's control panel door is in the unlocked and opened condition. Multiple sensors or switches (304) may be electrically connected in series to generate a common electrical signal (305).

The generated electrical negative signal (305) from the sensor or switch (304) may be fed to Relay (R1) coil at negative port (318). The electrical negative signal (305)

from the sensor or switch (304) may be further fed to respective generator set controller's configurable digital input (317). The positive port (319) of the Relay (R1) coil may be sourced from generator set's battery (301) positive (302) to complete the electrical path of the Relay (R1) coil. In the electrical circuit, Normally Closed (320) potential free contact is used from the Relay (R1) having common port (321) sourced from the respective generator set's battery (301) negative (303). The Normally Closed (320) contact signal (306) from Relay (R1) is fed to Relay's (R2) coil at negative port (323).

The electrical negative signal (308) may be fed to intercontroller's communication port (313 and 314) to provide an electrical negative signal (308) to all the generator sets which are connected in a synchronization loop. This electrical signal (308) may be fed to all the generator sets which are connected in synchronization and may be treated as "generator control panel door open in synchronization". The electrical negative signal (307) may be fed to respective generator set controller's configurable digital input. The electrical signal (307) may be treated as "generator control panel door open in synchronization". The positive port (323) of the Relay (R2) coil may be sourced from generator set battery (301) positive (302) to complete the electrical path of the Relay (R2) coil.

In the electrical circuit, Normally Open (327) potential free contact may be used from the Relay (R2) having common port sourced from the respective generator set's battery (301) negative (303) or positive (302) based on generator set's controller output polarity requirement. The Normally Open (327) contact signal from Relay (R2) may be fed to Relay's (R3) coil at negative port (328) or Positive port (329) based on generator set's controller output polarity requirement. To complete the electrical path of the Relay (R3), generator set's battery (301) positive (302) or negative (303) may be fed to Relay's (R3) coil based on the output (315) polarity received from generator set controller for CB open command to override in the event of generator set's control panel door being open. In the electrical circuit, Normally Open (327) potential free contact may be used from the Relay (R3) having common port sourced from the respective generator set battery (301) negative (303) or positive (302) or respective generator set's AC output based on the generator set's circuit breaker open coil compatibility. The Normally Open (331) contact signal from Relay (R3) may be fed to generator set's circuit breaker open coil. The generator set battery (301) negative signal (310) may be used to create a common negative bus across all the generator sets which are connected in a synchronization loop.

As explained herein, the interlock logic and architecture may be used for generator set control panel door interlock safety, which may be used to protect the bystander or user from any electrical hazard, as well as the functionality of the generator set, during synchronization or standalone operation. As soon as the generator set control panel door gets opened, the logic may ensure an electrical hazard may be eradicated.

All the generator sets which are connected in synchronization loop may be shut down immediately, upon opening even a single generator set's control panel door. It also refrains from starting any generator set. The functionality may be derived from electrical signal (308 and 310), which is an electrical bridge across all generator set's synchronization loop.

Unless and until the "under maintenance" generator set (if any) whose battery power gets disconnected is not isolated from the system completely, the interlock logic may not allow to start any generator set which is connected in synchronization loop. This feature may be obtained from an electrical signal (310) and Normally Closed contact (320) of Relay (R1).

The logic may allow synchronization of multiple generator sets, even those having different system voltages, e.g., 12 or 24 VDC battery voltage. This unique feature may be derived from an electrical signal (308) and the formation of common battery negative bridge (310) within the synchronization loop.

The logic may have a fail-safe operation with respect to incorrect integration or component failure. Normally Open contact (316) from Switch or Sensor (304) may be used to sense the control panel door position. In the event of Switch or Sensor failure, an electrical signal (305) may be deactivated, and it may be treated as control panel door open situation (from electrical circuit perspective).

Normally Closed contact (320) from Relay (R1) may offer an electrical isolation with respect to door interlock circuitry of all the generator sets connected in synchronization loop panel door position output from Switch or Sensor (304). In the event of Relay (R1) failure, an electrical signal (306) may be activated, which may be treated as control panel door open situation (from electrical circuit perspective).

An electrical signal (309) may be used for generator set's circuit breaker open command, irrespective of generator set controller input configuration for electrical signal (307 and 317). The logic ensures opening the circuit breaker of all the generator sets connected in synchronization loop. The opening of circuit breakers may be initiated immediately after opening any generator control panel door. As a result, all the generator sets connected in synchronization loop may be shut down.

Generator sets connected in synchronization may be shut down with an alarm "Genset Door Open in Synch," and the genset whose door is opened may have the alarm popped up as "Genset Door Open" along with an alarm "Genset Door Open in Synch." This may help to identify the exact generator set from which the alarm is triggered. This may ensure ease of troubleshooting by providing alarm bifurcation on controller display for respective genset door open event. The architecture may be independent with respect to generator controller.

Figure 4:
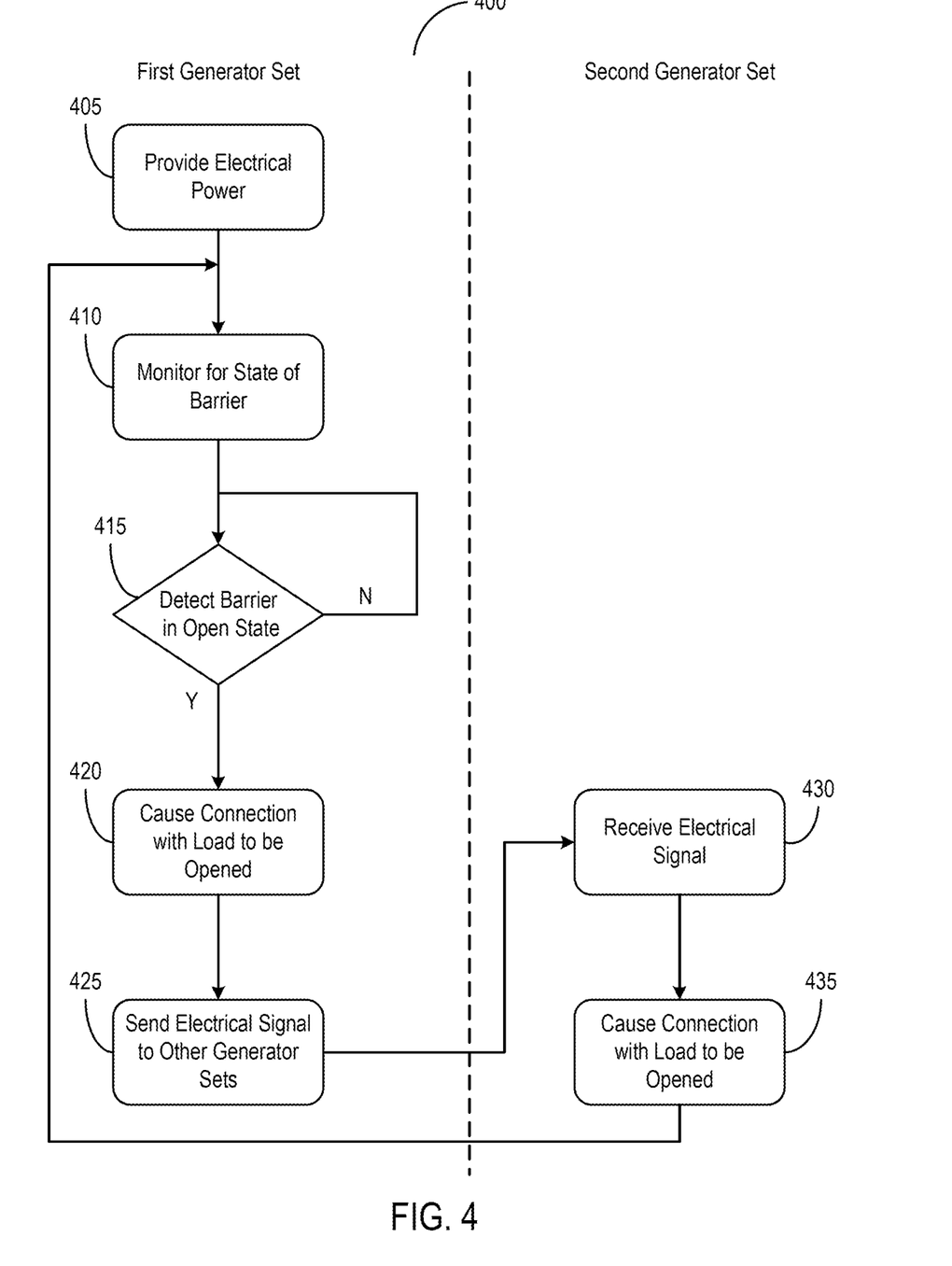
FIG. 4 is a flow diagram of a method of synchronizing generator sets in accordance with an illustrative embodiment.

Referring to FIG. 4, depicted is a flow diagram of a method 400 of synchronizing generator sets. The method 400 can be implemented or performed using any of the components detailed herein, such as the generator set 100, the system 200, and the interlock circuitry 300, among others. The method 400 can include providing electrical power from a power supply of a first generator set to a load (405). A power supply can deliver electrical power through the first generator set to the load via a bus. The power supply can include, for example, an engine, a battery pack, a microgrid, a fuel cell, a renewable power source, a modular reactor, a mixed fuel power source, or a power station, among others. The electrical power provided by the power source to the load can be alternating current (AC) power and can be synchronized with the AC electrical power conveyed on the bus. The generator sets can deliver the AC electrical power to the load in synchronization with one another.

The method 400 can include monitoring a state of a barrier in the first generator set (410). The barrier can be a physical element structured to cover a control panel on the first generator set to prevent physical access from outside the first generator set. The barrier can be in a closed state to obstruct access to the control panel from outside the first generator set or in an open state to allow access to the control panel from outside the first generator set. A sensor can identify the barrier as in the open state or the close state. The sensor can use any number of methods, such as use of a photodetector, an electrical current running through the barrier, a switch, or a proximity sensor, among others. The method 400 can include detecting whether the barrier of the first generator set is in an open state (415). When the sensor indicates that the barrier is in the open state, an interlock of the first generator set can detect that the barrier is in the open state. Conversely, when the sensor indicates that the barrier is in the closed state, the interlock can detect that the barrier is in the closed state. The sensor can continue to monitor whether the state of the barrier is in the open or closed state.

The method 400 can include causing the connection with the load to be opened, in response to detecting that the barrier is in the open state (420). The interlock of the first generator set can cause the connection between the power supply and the load to be disconnected or opened. With the disconnection, the first generator set can cease delivery of the electrical power onto a bus coupled with the load. The interlock can send a command signal to a circuit breaker to interrupt or disconnect the connection. In addition, the interlock can initiate shutdown of the first generator set or the power supply. A control panel of the first generator set can also display a fault indication identifying the barrier at the first generator set as in the open state.

In some embodiments, the interlock can also restrict reactivation of the first generator set and reconnection of the first generator set with the load until the first barrier is detected as reverted to the closed state. In some embodiments, the interlock can restrict or prevent activation of the power supply of the first generator set in response to a start command, when the power supply is connected with the bus coupled with other generator sets and while the barrier is in the open state. In some embodiments, the interlock can initiate activation of the first generator set (or the power supply) in response to a start command, when the power supply is isolated or disconnected from the bus.

The method 400 can include sending an electrical signal to other generator sets (425). The interlock of the first generator set can send the electrical signal to indicate that the barrier of the first generator set is in the open state to allow access to the control panel. The electrical signal can also indicate that the first generator set or the power supply therein is shut down. The electrical signal can be a command to cause another generator set to disconnect or open a connection between the other generator set and the load to be opened. The method 400 can include receiving the electrical signal from the first generator set (430). An interlock of the second generator set can receive the electrical signal indicating that the barrier of the first generator set is in the open state from the first generator set. In some embodiments, the method 400 can omit step (430).

The method 400 can include causing the connection with the load to be opened (435), in response to receiving the electrical signal from the first generator set. The interlock of the second generator set can cause the connection between the power supply and the load to be disconnected or opened. With the disconnection, the second generator set can cease delivery of the electrical power onto a bus coupled with the load. The interlock of the second generator set can send a command signal to a circuit breaker to interrupt or disconnect the connection between the second generator set and the power supply. In addition, the interlock can initiate shutdown of the second generator set or the power supply. A control panel of the second generator set can also display a fault indication identifying the barrier at another generator set as in the open state. In some embodiments, the method 400 can omit step (435). The method 400 can repeat from step (410). For example, the interlock of the first generator set can monitor the state of the barrier. When the barrier is detected to be in the closed state, the interlock can activate (or allow activation of) the first generator set.

While this specification contains various implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub-combination. Moreover, although features may be described as acting in certain combinations and even initially claimed as such, one or more features from a claimed combination can, in some cases, be excised from the combination, and the claimed combination may be directed to a sub-combination or variation of a sub-combination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, means the joining of two components directly or indirectly to one another. Such joining may be stationary (e.g., permanent) or moveable (e.g., removable or releasable). Such joining may be achieved with the two components, or the two components and any additional intermediate components, being integrally formed as a single unitary body with one another, or with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

Also, the term "or" is used, in the context of a list of elements, in its inclusive sense (and not in its exclusive sense) so that, when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc., may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values herein are inclusive of their maximum values and minimum values unless otherwise indicated. Furthermore, a range of values does not necessarily require the inclusion of intermediate values within the range of values unless otherwise indicated.

It is important to note that the construction and arrangement of the various systems and the operations according to various techniques shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

What is claimed is:

1. A system for sharing loads across generator sets, comprising:
   a plurality of generator sets electrically coupled with one another via a bus to deliver electrical power to a load;
   a first generator set of the plurality of generator sets, comprising:
      a first control panel comprising at least one element configured to manage delivery of at least a portion of the electrical power between the first generator set and the load;
      a first barrier structured to cover the first control panel to obstruct access to the at least one element on the first control panel from outside the first generator set;
      a first sensor configured to monitor for a state of the first barrier as one of: (i) a closed state to obstruct the access to the at least one element or (ii) an open state allowing the access to the at least one element; and
      a first interlock configured to send, responsive to detection of the first barrier in the open state, an electrical signal via the bus to each generator set of the plurality of generator sets to disconnect from the load to terminate delivery of the electrical power.

2. The system of claim 1, further comprising a second generator set of the plurality of generator sets configured to:
   receive, via the bus from the first generator set, the electrical signal to disconnect; and
   cause, responsive to receipt of the electrical signal, an open connection between the second generator set and the load.

3. The system of claim 2, wherein the second generator set further comprises a second control panel configured to present, responsive to the open connection, a fault indication identifying another barrier on another generator set as in the open state.

4. The system of claim 1, wherein the first interlock is further configured to:
   receive a second electrical signal via the bus from a second generator set of the plurality of generator sets, in response to detection of a second barrier on the second generator set as being in an open state to allow access to a second control panel of the second generator set; and
   cause, responsive to receipt of the second electrical signal, an open connection between the first generator set and the load.

5. The system of claim 1, wherein the first control panel is further configured to:
   present, responsive to detection of the first barrier in the open state, a first fault indication identifying the first barrier on the first generator set as in the open state; and
   present, responsive to detection of another barrier in an open state, a second fault indication identifying the other barrier on another generator set of the plurality of generator sets as in the open state.

6. The system of claim 1, wherein the first interlock is further configured to restrict, subsequent to the detection of the first barrier in the open state, reconnection of the first generator set with the load until detection of the first barrier reverting to the closed state.

7. The system of claim 1, wherein the plurality of generator sets is further configured to deliver alternating current (AC) electrical power in synchronization with one another to the load via the bus.

8. A first generator set for providing power, comprising:
   a power supply electrically coupled with a load to deliver electrical power;
   a control panel configured to manage delivery of the electrical power from the power supply to the load;
   a barrier structured to cover the control panel to obstruct access to the control panel from outside the first generator set;
   a sensor configured to monitor for a state of the barrier as one of (i) a closed state or (ii) an open state; and
   an interlock structured to be coupled with the power supply and the sensor, the interlock configured to:
      cause, responsive to detection of the barrier in the open state, a first connection between the power supply and the load to be opened cease delivery of the electrical power; and
      send, responsive to opening of the first connection, an electrical signal to a second generator set to cause a second connection between the second generator set and the load to be opened.

9. The first generator set of claim 8, wherein the interlock is further configured to:
   receive a second electrical signal sent by the second generator set in response to detecting a second barrier on the second generator set in the open state; and
   cause, responsive to receipt of the second electrical signal, the first connection between the power supply and the load to be opened.

10. The first generator set of claim 8, wherein the interlock is further configured to:
   determine that the power supply is connected with a bus structured to couple a plurality of generator sets with the load while the barrier is in the open state; and
   refrain, responsive to determination that the power supply is connected while the barrier is in the open state, activation of the power supply of the first generator set in response to a start command.

11. The first generator set of claim 8, wherein the interlock is further configured to:
   determine that the power supply is disconnected from a bus structured to couple a plurality of generator sets with the load; and
   activate, responsive to determination that the power supply is disconnected and receipt of a start command, the power supply of the first generator set.

12. The first generator set of claim 8, wherein the power supply is further configured to use a direct current (DC) voltage different from a second power supply of the second generator set, wherein the first generator set and the second generator set is further configured to output alternating current (AC) power to the load in synchronization.

13. The first generator set of claim 8, wherein the control panel is further configured to:
   display, responsive to detection of the barrier in the open state, a first fault indication identifying the barrier on the first generator set as in the open state; and
   display, responsive to detection of another barrier in an open state, a second fault indication identifying the barrier on another generator set of a plurality of generator sets as in the open state.

14. The first generator set of claim 8, wherein the power supply further comprises at least one of: (i) a generator, (ii) a battery pack, (iii) a solar panel, (iv) a fuel cell, or (v) a mixed fuel source.

15. A method of synchronizing generator sets, comprising:
   providing electrical power from a power supply of a first generator set of a plurality of power generator sets to a load;
   monitoring for a state of a first barrier of the first generator set as one of: (i) a closed state to obstruct the access to a first control panel on the first generator set or (ii) an open state allowing the access to the first control panel;
   causing, responsive to detection of the first barrier in the open state, a first connection between the power supply of the first generator set and the load to be opened to cease delivery of the electrical power; and
   sending, responsive to opening the first connection, an electrical signal to a second generator set of a plurality of generator sets to cause a second connection between the second generator set and the load to be opened.

16. The method of claim 15, further comprising
   receiving a second electrical signal from the second generator set, in response to detection of a second barrier on the second generator set as in an open state to allow access to a second control panel of the second generator set; and
   causing, responsive to receipt of the second electrical signal, the first connection between the power supply of first generator set and the load to be opened.

17. The method of claim 15, further comprising initiating, responsive to determination that the power supply is disconnected from a bus to couple the plurality of generator sets with the load, activation of the power supply of the first generator set in response to a start command.

18. The method of claim 15, further comprising preventing, responsive to the power supply being connected a bus to couple the plurality of generator sets with the load while the first barrier is in the open state, activation of the power supply of the first generator set in response to a start command.

19. The method of claim 15, further comprising restricting reconnection of the first generator set with the load until detection of the first barrier as reverting to the closed state.

20. The method of claim 15, further comprising delivering, via the plurality of generator sets in synchronization with one another, alternating current (AC) electrical power to the load, prior to detection of the first barrier in the open state.

* * * * *